(12) United States Patent
Sahr

(10) Patent No.: US 6,408,708 B1
(45) Date of Patent: Jun. 25, 2002

(54) RACK AND PINION STEERING GEAR WITH LOW FRICTION YOKE ASSEMBLY

(75) Inventor: Paul R. Sahr, Lake Orion, MI (US)

(73) Assignee: TRW Inc., Lyndhurst, OH (US)

( * ) Notice: Subject to any disclaimer, the term of this patent is extended or adjusted under 35 U.S.C. 154(b) by 120 days.

(21) Appl. No.: 09/636,018

(22) Filed: Aug. 10, 2000

(51) Int. Cl.[7] .................................................. F16H 1/04
(52) U.S. Cl. ........................ 74/422; 74/388 PS; 180/428
(58) Field of Search ............................. 74/388 PS, 422, 74/109, 409, 498; 180/428

(56) References Cited

U.S. PATENT DOCUMENTS

| 4,271,716 A | * | 6/1981 | Carduner ..................... 74/422 |
| 4,531,603 A | | 7/1985 | VanCise, Jr. |
| 4,553,447 A | | 11/1985 | Betz |
| 4,619,155 A | | 10/1986 | Futaba |
| 4,762,014 A | | 8/1988 | Sano |
| 5,287,764 A | * | 2/1994 | Beer .......................... 74/498 |
| 6,119,540 A | * | 9/2000 | Phillips ....................... 74/422 |

* cited by examiner

Primary Examiner—David Fenstermacher
(74) Attorney, Agent, or Firm—Tarolli, Sundheim, Covell, Tummino & Szabo L.L.P.

(57) ABSTRACT

A rack and pinion steering gear (10) comprises a housing (12). A pinion gear (24) is rotatably mounted in the housing (12). A rack bar (32) is movable relative to the pinion gear (24). The rack bar (32) has teeth in meshing engagement with the pinion gear (24). The rack and pinion steering gear (10) further comprises a yoke assembly (38) in the housing (12) for supporting and guiding movement of the rack bar (32) relative to the pinion gear (24). The yoke assembly (38) comprises a yoke (40) and a plurality of balls (64). The yoke (40) has a first surface (46) and a plurality of slots (52) which intersect the first surface (46). Each ball (64) is inserted into a respective slot (52). Each ball (64) projects from its respective slot (52) and beyond the first surface (46) of the yoke (40) when load conditions on the yoke assembly (38) are below a predetermined level. Each ball (64) is movable in its respective slot (52) relative to the first surface (46) of the yoke (40) as load conditions on the yoke assembly (38) change.

5 Claims, 2 Drawing Sheets

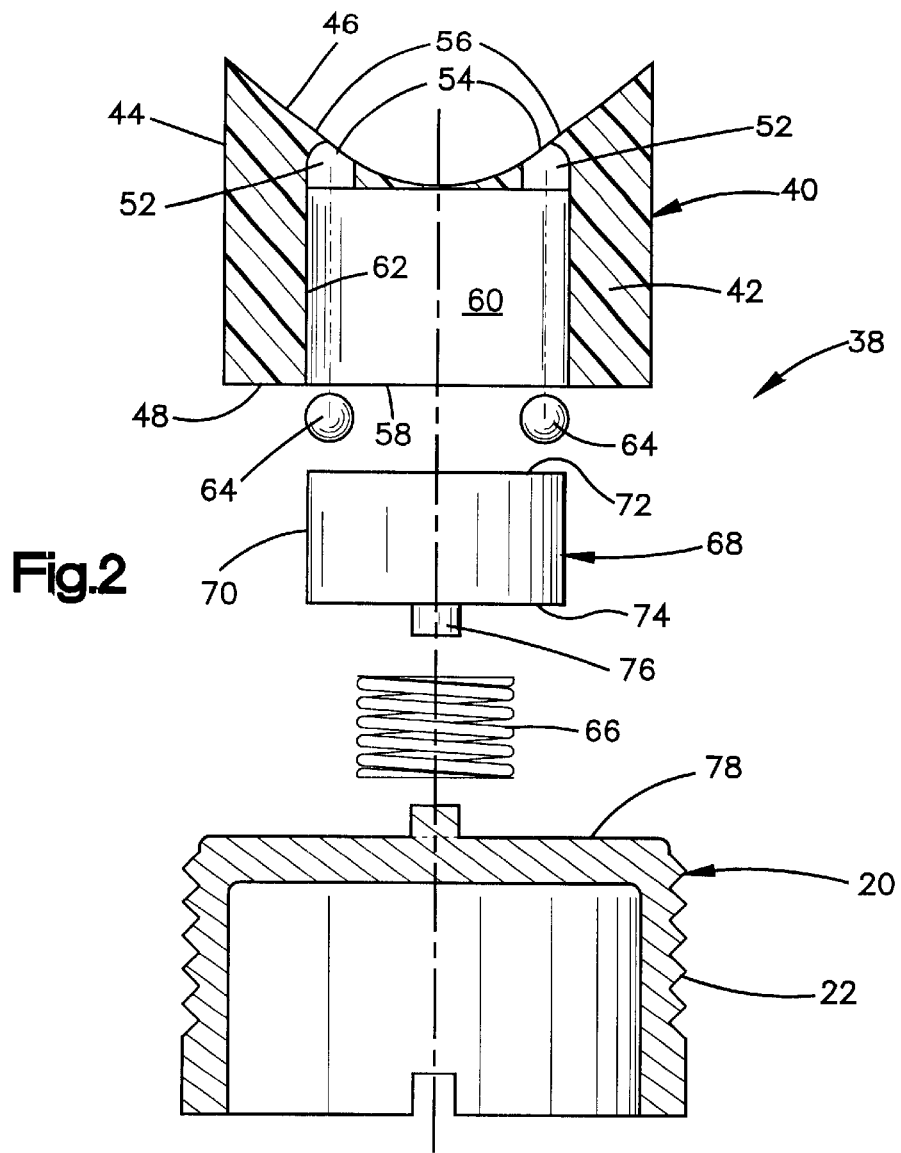
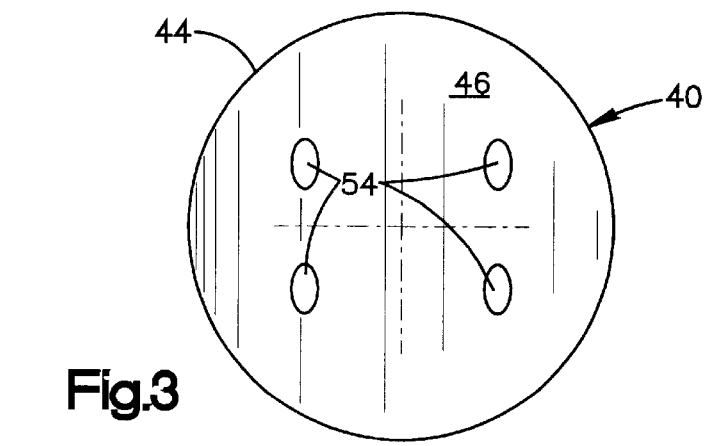

RACK AND PINION STEERING GEAR WITH LOW FRICTION YOKE ASSEMBLY

TECHNICAL FIELD

The present invention relates to a rack and pinion steering gear and, more particularly, to a rack and pinion steering gear having a low friction yoke assembly.

BACKGROUND OF THE INVENTION

A known rack and pinion steering gear includes a pinion gear that is rotatably mounted in a housing and is connected with a steering wheel of a vehicle. A rack bar extends through the housing and has opposite end portions connected with steerable vehicle wheels. Gear teeth formed on the rack bar are disposed in meshing engagement with gear teeth on the pinion gear. A yoke assembly is disposed in the housing to support and guide movement of the rack bar relative to the housing. The support provided by the yoke assembly helps to ensure proper lash between the gear teeth of the rack bar and the gear teeth of the pinion gear. Rack and pinion steering gears having this general construction are disclosed in U.S. Pat. Nos. 3,623,379, 4,811,813, and 5,357,845.

During operation of this known rack and pinion steering gear, the yoke assembly may be subjected to both heat and high loads. The heat is produced due to friction between the rack bar and the yoke assembly as the rack bar moves relative to a support surface of the yoke assembly. A high load may occur, for example, when a vehicle hits a pothole in the road surface. The impact load of the vehicle tire with the pothole is transferred to the rack bar through the vehicle tie rods. The rack bar, in turn, transfers a portion of the load to the yoke assembly.

Both the heat and the high loads may cause a deflection in the yoke assembly. As a result, the yoke assembly may fail to properly support the rack bar and tooth wear on the rack bar and/or on the pinion gear may develop. Thus, a need exists for a low friction yoke assembly that provides sufficient support to the rack bar under high load conditions.

SUMMARY OF THE INVENTION

The present invention is directed to a rack and pinion steering gear. The rack and pinion steering gear comprises a housing. A pinion gear is rotatably mounted in the housing. A rack bar is movable relative to the pinion gear. The rack bar has teeth in meshing engagement with the pinion gear. The rack and pinion steering gear further comprises a yoke assembly in the housing for supporting and guiding movement of the rack bar relative to the pinion gear. The yoke assembly comprises a yoke and a plurality of balls. The yoke has a first surface and a plurality of slots which intersect the first surface. Each ball is located in a respective slot. Each ball projects from its respective slot and beyond the first surface of the yoke when load conditions on the yoke assembly are below a predetermined level. Each ball is movable in its respective slot relative to the first surface of the yoke as load conditions on the yoke assembly change.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is an exploded side view of the yoke assembly of FIG. 1 and a housing plug; and FIG. 3 is a top view of the yoke of the yoke assembly.

DESCRIPTION OF PREFERRED EMBODIMENT

Figure 1:
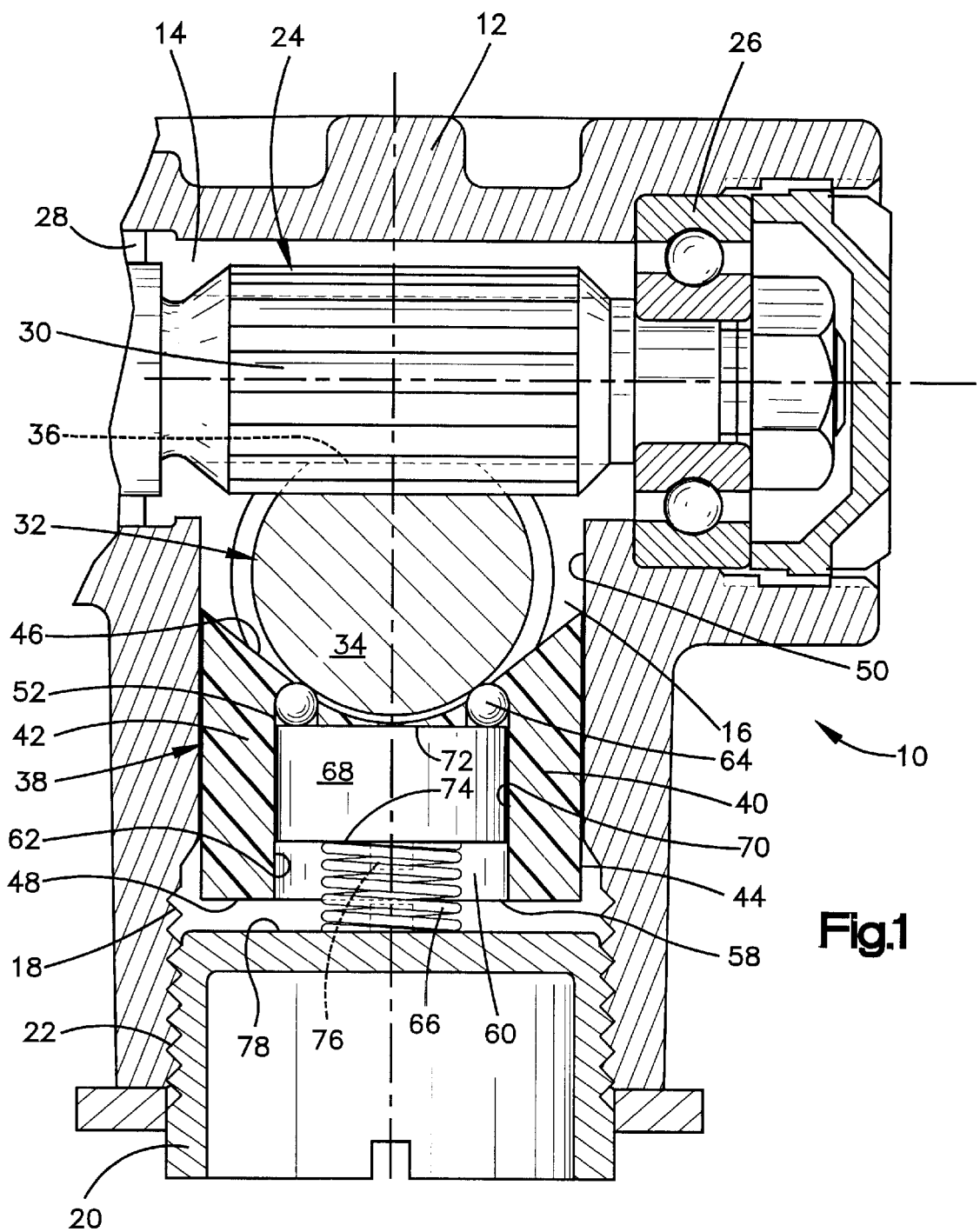
FIG. 1 is a sectional view of a rack and pinion steering gear having a yoke assembly constructed in accordance with the present invention.

A sectional view of the rack and pinion steering gear 10 of the present invention is illustrated in FIG. 1. The rack and pinion steering gear 10 includes a housing 12. Preferably, the housing 12 is made of cast metal. The housing 12 includes two channels that extend perpendicular to one another. A first channel 14 extends through the main body of the housing. A second channel 16 extends from the first channel 14 at a location near an end of the first channel 14. The second channel 16 terminates at a threaded opening 18. A cylindrical plug 20 having a threaded outer surface 22 threads into the opening 18 in the housing 12 to close an end of the second channel 16.

A pinion gear 24 is located in the first channel 14 of the housing 12. Two bearing assemblies rotatably support the pinion gear 24 in the housing 12. The first bearing assembly 26 is located at one end of the pinion gear 24. A second bearing 28 is located at an opposite end of the pinion gear 24.

The pinion gear 24 is connected with the vehicle steering wheel (not shown). Rotation of the vehicle steering wheel causes rotation of the pinion gear 24. A plurality of teeth 30 extends around the outer circumference of the pinion gear 24.

A portion of a longitudinally extending rack bar 32 extends through the housing 12. The rack bar 32 has opposite end portions (not shown) that are connected to the steerable wheels of the vehicle through tie rods (not shown). The rack bar 32 has a generally cylindrical main body 34. An upper surface 36 of the rack bar 32 has a plurality of teeth (not shown). The plurality of teeth of the rack bar 32 is disposed in meshing engagement with the plurality of teeth 30 of the pinion gear 24. Within the housing 12, a portion of the rack bar 32, including the upper surface 36 of the rack bar 32, is located within the first channel 14 of the housing 12; while the remainder of the rack bar 32 extends into the second channel 16 of the housing 12.

A low friction yoke assembly 38, in accordance with the present invention, is located within the second channel 16 of the housing 12. The yoke assembly 38 at least partially supports and guides movement of the rack bar 32 relative to the housing 12.

As shown in FIG. 2, the yoke assembly 38 includes a yoke 40 having a cylindrical main body 42 with a smooth outer surface 44. Preferably, the yoke 40 is made from plastic. The yoke 40 further has an arcuate first surface 46 and a flat second surface 48. The yoke 40 is located in the second channel 16 of the housing 12 such that the first surface 46 is nearest the rack bar 32. The smooth outer surface 44 of the cylindrical main body 42 of the yoke 40 contacts and is movable with respect to an interior surface 50 of the second channel 16. A protrusion (not shown) extending radially inwardly from the interior surface 50 (FIG. 1) of the second channel 16 interacts with the yoke 40 to limit the movement of the yoke 40 into the second channel 16 of the housing 12. The purpose of limiting the movement of the yoke 40 into the second channel 16 of the housing 12 will be discussed further below.

The arc of the first surface 46 of the yoke 40 is sized and shaped to accommodate a portion of the outer surface of the rack bar 32. Four slots 52, two of which are shown in FIG. 2, extend from within the cylindrical main body 42 of the yoke 40 and intersect the first surface 46 of the yoke 40. The intersection of the slots 52 with the first surface 46 of the yoke 40 creates openings 54 (FIGS. 2 and 3) in the first surface 46 of the yoke 40. Although the openings 54 in the first surface 46 are circular, in FIG. 3 the openings 54 appear to be oval since they are located on the arcuate first surface 46 of the yoke 40. A lip 56 formed from an extension of the first surface 46 reduces the diameter of each opening 54 such that the openings 54 in the first surface 46 of the yoke 40 are smaller in diameter than the slots 52 within the yoke 40.

The second surface 48 of the yoke 40 is flat and includes a centrally located opening 58 to a bore 60. The bore 60 extends from the second surface 48 toward the first surface 46 of the yoke 40. The bore 60 intersects the slots 52 at a location internal to the yoke 40. In FIG. 2, the bore 60 terminates near the first surface 46 of the yoke 40. The bore 60 has a cylindrical sidewall 62 that extends parallel to the smooth outer surface 44 of the cylindrical main body 42 of the yoke 40.

The yoke assembly 38 also includes a plurality of balls 64. Preferably, each ball 64 is made from steel. One ball 64 is located within each slot 52 of the yoke 40. Thus, the yoke assembly 38 illustrated has four balls 64, two of which are shown in FIGS. 1 and 2. Each ball 64 is sized such that it is movable within the respective slot 52 but is too large to exit the respective opening 54 in the first surface 46. Thus, when a ball 64 is inserted into a slot 52 and the ball rests against the lip 56 formed on the first surface 46, a portion of the ball 64 will extend from the slot 52 and beyond the first surface 46 of the yoke 40; while a majority of the ball 64 will remain within the slot 52 internal to the yoke 40.

Each ball 64 is biased toward the first surface 46 of the yoke 40 by a biasing element, such as a spring 66. In FIGS. 1 and 2, a single spring 66 is used to bias all four balls 64 toward the first surface 46 of the yoke 40. The single spring 66 in FIGS. 1 and 2 biases all four balls 64 with the help of a ball seat 68. The ball seat 68 has a cylindrical outer surface 70 that fits within and is movable with respect to the bore 60 of the yoke 40. The ball seat 68 has a flat upper surface 72 for supporting the four balls 64 and a flat lower surface 74 for contacting the spring. A spring guide 76 may be located on the flat lower surface 74 of the ball seat 68 for helping to guide the spring 66.

Although a ball seat 68 having a flat upper surface 72 and a flat lower surface 74 is preferred, ball seats 68 having different configurations are contemplated by the present invention. Examples of different configurations of the ball seat 68 include but are not limited to a ball seat 68 having an upper surface 72 with divots in which a portion of each ball 64 rotates or having an upper surface 72 with extensions that extend into the respective slots 52 to support the balls 64, or a ball seat 68 having a bottom surface 74 with provisions for connecting to the spring 66 or with provisions for limiting movement of the ball seat 68 toward the plug 20 in the housing 12.

The spring 66 is disposed between the flat bottom surface 74 of the ball seat 68 and the plug 20 in the second channel 16 of the housing 12. The spring 66 has a constant compression rate and the biasing force of the spring 66 is proportional to the amount of compression of the spring 66. The initial compression of the spring 66 is controlled by the distance that the plug 20 is threaded into the threaded opening 18 of the second channel 16 of the housing 12. Ideally, the spring 66 should press the balls 64 against the lip 56 of the first surface 46 of the yoke 40 while allowing the balls 64 to rotate within the slots 52 as the rack bar 32 moves relative to the yoke assembly 38.

During operation of the rack and pinion steering gear 10, the yoke assembly 38 of the present invention supports and guides movement of the rack bar 32 primarily with the four balls 64. Under normal operating loads, the yoke assembly 38 is configured as shown in FIG. 1. The spring 66 biases the ball seat 68 and thus the balls 64 such that each ball 64 extends outwardly from the respective slot 52 and beyond the first surface 46 of the yoke 40. The outwardly extending portion of each ball 64 contacts and supports the rack bar 32. During movement of the rack bar 32 relative to the housing 12, the balls 64 rotate within their respective slots 52 to provide low friction guidance of the rack bar 32. By guiding the rack bar 32 using the balls 64, as opposed to having the rack bar 32 slide over a surface of the yoke 40, the amount of heat generated by friction is minimized.

The yoke assembly 38 is designed such that the coefficient of friction between the smooth outer surface 44 of the cylindrical main body 42 of the yoke 40 and the interior surface 50 of the second channel 16 of the housing 12 is less than the coefficient of friction between the cylindrical sidewall 62 of the bore 60 in the yoke 40 and the cylindrical outer surface 70 of the ball seat 68. Thus, as the load conditions on the yoke assembly 38 increase and the spring 66 begins to compress, the ball seat 68 stays in a forward most position with respect to the yoke 40 while the entire yoke assembly 38 moves toward the plug 20 in the second channel 16 of the housing 12. The entire yoke assembly 38 moves until the flat second surface 48 of the yoke 40 contacts an interior surface 78 of the plug 20 in the housing 12. After the second surface 48 of the yoke 40 has contacted the interior surface 78 of the plug 20, a further increase in load conditions causes the ball seat 68 to begin to move within the bore 60 of the yoke 40. Increased load conditions will cause the ball seat 68 to move toward the plug 20 in the housing 12. As a result, the balls 64 will begin to be pushed farther into their respective slots 52 in the yoke 40. When the load conditions reach a predetermined level, the rack bar 32 makes contact with a portion of the first surface 46 of the yoke 40 and the balls 64 no longer extend beyond the first surface 46 of the yoke 40.

The predetermined level of the load conditions is the load level sufficient to compress the spring 66 a distance to cause the second surface 48 of the yoke 40 to contact the interior surface 78 of the plug 20 in the housing 12 plus a distance to cause the balls 64 to move into the slots 52 until the rack bar 32 contacts the first surface 46 of the yoke 40. When the load conditions are at or above the predetermined level, the first surface 46 of the yoke 40, in combination with the balls 64 which are still in contact with the rack bar 32, supports and guides the rack bar 32.

As load conditions on the yoke assembly 38 decrease below the predetermined level, the spring 66 begins to expand. Since the coefficient of friction between the smooth outer surface 44 of the yoke 40 and the interior surface 50 of the second channel 16 is lower than the coefficient of friction between the cylindrical sidewall 62 of the bore 60 and the cylindrical outer surface 70 of the ball seat 68, the expansion of the spring 66 causes the entire yoke assembly 38 to move away from the plug 20 in the second channel 16 of the housing 12. The entire yoke assembly 38 continues to move in proportion to the decreasing load conditions until the yoke 40 contacts the protrusion (not shown) on the interior surface 50 of the second channel 16. The protrusion prevents the yoke 40 from moving farther into the second channel 16. As a result, a further decrease in the load conditions causes the ball seat 68 to move within the bore 60 of the yoke 40. The movement of the ball seat 68 is toward the first surface 46 of the yoke 40. This movement of the ball seat 68 causes the balls 64 to begin to extend from the openings 54 and beyond the first surface 46 of the yoke 40. The balls 64 continue to move outwardly due to the decreasing loads until the balls 64 are again pressed against the lips 56 surrounding the openings 54.

From the above description of the invention, those skilled in the art will perceive improvements, changes and modifications. Such improvements, changes and modifications may include different structure for stopping the movement of the yoke 40 within the second channel 16 of the housing 12 or the use of multiple springs 66 for biasing the balls 64. Such improvements, changes and modifications within the skill of the art are intended to be covered by the appended claims.

Having described the invention, the following is claimed:

1. A rack and pinion steering gear comprising:

a housing;

a pinion gear rotatably mounted in the housing;

a rack bar movable relative to the pinion gear, the rack bar having teeth in meshing engagement with the pinion gear; and a yoke assembly in the housing for supporting and guiding movement of the rack bar relative to the pinion gear, the yoke assembly comprising a yoke and a plurality of balls, the yoke having a first surface and a plurality of slots which intersect the first surface, each ball being located and remaining in a respective slot, each ball projecting from its respective slot and beyond the first surface of the yoke when load conditions on the yoke assembly are below a predetermined level, each ball being movable in its respective slot relative to the first surface of the yoke as load conditions on the yoke assembly change.

2. The rack and pinion steering gear of claim 1 further being defined by:

each ball moving further into the respective slot in the yoke as load conditions on the yoke assembly increase, the plurality of balls no longer projection from the respective slots when load conditions on the yoke assembly increase above the predetermined level.

3. The rack and pinion steering gear of claim 2 further being defined by:

each ball being biased toward the first surface of the yoke by a biasing element.

4. The rack and pinion steering gear of claim 3 further comprising:

a bore extending from a second surface of the yoke, the second surface being opposite the first surface, the bore intersecting the plurality of slots within the yoke below the first surface.

5. The rack and pinion steering gear of claim 4 further comprising:

a ball seat for supporting the plurality of balls, the ball seat being inserted into the bore of the yoke and being movable within the bore of the yoke, the biasing element biasing a ball seat toward the first surface of the yoke.

* * * * *